R. W. MEWES.
VALVE FOR ENGINES.
APPLICATION FILED JAN. 3, 1916.

1,227,479.

Patented May 22, 1917.
2 SHEETS—SHEET 1.

Witness.
G. F. Furechek.

Inventor.
Richard W. Mewes

R. W. MEWES.
VALVE FOR ENGINES.
APPLICATION FILED JAN. 3, 1916.
1,227,479.
Patented May 22, 1917.
2 SHEETS—SHEET 2.
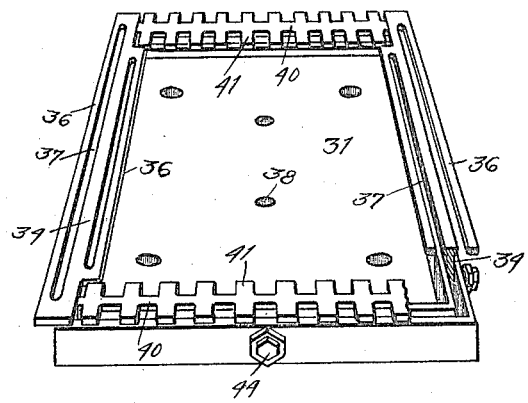
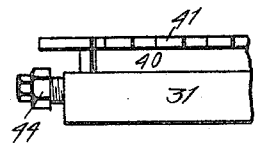
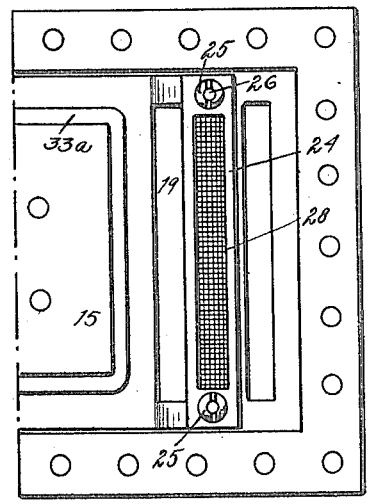
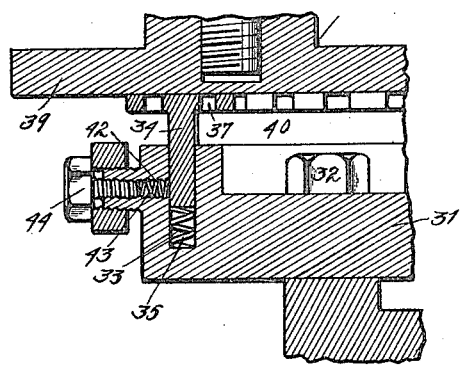

UNITED STATES PATENT OFFICE.

RICHARD W. MEWES, OF DES MOINES, IOWA.

VALVE FOR ENGINES.

1,227,479.

Specification of Letters Patent. Patented May 22, 1917.

Application filed January 3, 1916. Serial No. 69,832.

*To all whom it may concern:*

Be it known that I, RICHARD W. MEWES, a subject of the King of Great Britain, and resident of Des Moines, in the county of Polk and State of Iowa, have invented a certain new and useful Valve for Engines, of which the following is a specification.

The object of my invention is to provide a valve of simple, durable and inexpensive construction, for engines, particularly locomotives.

A further object is to provide a valve of the D type, so constructed and arranged that the valve will be always tight.

A further object is to provide a valve of the type mentioned having a central body and extensions at the sides thereof, having means for collecting, and distributing a lubricant.

Still a further object is to provide a D valve of the type mentioned adapted for use in locomotives, so constructed and arranged as to be balanced.

Still a further object is to provide a balanced D valve of the type described, constructed and arranged for suitably lubricating the parts at the upper end of the valve.

My invention consists in the construction, arrangement and combination of the various parts of the device, whereby the objects contemplated are attained as hereinafter more fully set forth, pointed out in my claims and illustrated in the accompanying drawings, in which:

Fig. 3 shows a top or plan view of one end of my D valve with the cover plates 34 and the plate 39 removed for the purpose of illustrating other parts of the invention.

Fig. 4 is a detail, perspective view of part of the packing and balancing mechanism at the upper part of the valve.

Fig. 5 is a front elevation of a portion of the front end of the mechanism shown in Fig. 4, showing the manner in which the two packing plates or strips are arranged at right angles to each other and joined, and Fig. 6 shows a vertical, sectional view taken on the same line as Fig. 2, but enlarged for the purpose of clearness, and showing only a small part of the valve.

Figure 1:
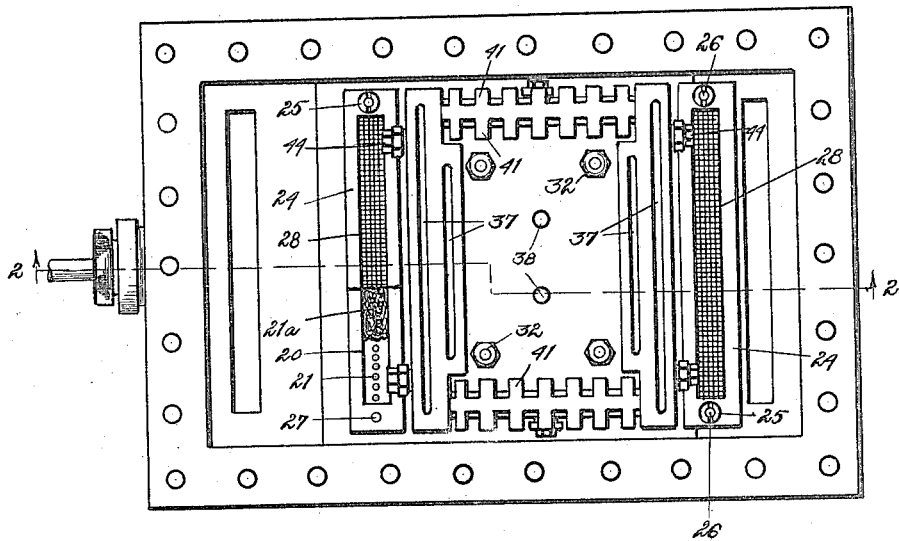
Figure 1 shows a top, or plan view of the steam chest with my improved D valve therein, the top or cover of the steam chest being removed.

In the accompanying drawings, I have used the reference numeral 10 to indicate generally the steam chest of a locomotive engine, having the intake ports 11 arranged in the bottom of the steam chest near the ends thereof, and having the main exhaust port 12 preferably in the center of the bottom of the steam chest and having the ports 13 arranged on opposite sides of the port 12 for steam from the opposite ends of the cylinder.

The portion of the bottom of the steam chest forms a valve seat 14. Arranged to slide on the seat 14 is a sliding D valve, having a main central body portion 15 operatively connected with which is the valve stem 16, slidably extended through the side of the steam chest. In the lower central portion of the body 15 of the D valve is a recess 17 adapted at all times to be in communication with the port 12 and adapted in different positions of the sliding movement of the valve also to be selectively in communication with the ports 13.

Figure 2:
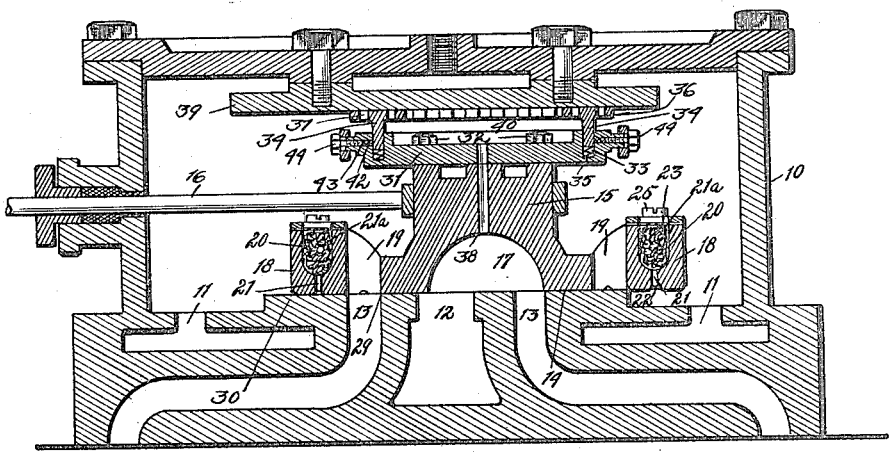
Fig. 2 shows a vertical, sectional view, taken on the line 2—2 of Fig. 1.

Formed on the lower portion of the valve body are opposite lateral extensions 18, which at their outer ends are thicker than the intermediate portions of said extensions 18, as clearly shown in Fig. 2. Formed in the extensions 18 between their ends and the body 15 are ports 19. The right-hand port 19 on the left-hand movement of the valve is adapted to register with the right-hand port 13, and the left-hand port 19 is adapted in the right-hand movement of the valve to register with the left-hand port 13.

In the upper portions of the outer ends of the extensions 18 are recesses 20 in which I preferably mount suitable material 21ª such as waste or the like for collecting, holding and distributing a lubricant.

Extending downwardly from the lower parts of the recesses 20 is a plurality of small passages 21 whereby a lubricant can pass downwardly from the recesses 20 to the lower surfaces of the extensions 18. The lower surfaces of the extensions 18 are provided with grooves 22, for connecting the lower ends of the small passages 21.

The upper portion of the outer ends of the extensions 18 are preferably covered with a screen or the like 23. The recesses 20 do not extend to the ends of the extensions 18.

Resting above the screen are frames 24 adapted to be secured to the extensions 18 by means of screw-threaded bolts 25, having in them openings 26 registering with the opening 27 extending downwardly through the ends of the extensions 18, whereby a lubricant can pass through the screws downwardly through the extensions 18. The central portions of the frames 24 are cut away at 28 to admit the lubricant from the steam chest to the screen 23, and therethrough to the material 21ª and the passages 21.

Before describing the structural features of my improved valve whereby it is balanced, I will explain the operation and advantages of the extensions 18.

D valves of the type used in locomotive engines are ordinarily constructed without such extensions, and with portions which extend as far as the inner walls of the passages 19. It will thus be seen that in the ordinary D valve there are no passages 19, but steam in the different positions of the valve passes downwardly past the sides of the D valve into the ports 13. It is well known that in D valves there is a pressure, at certain times, upwardly on the sides of the valve, so that the valve tends to have a rocking motion, whereby the corners of the valve at 29 tend to become worn and rounded, and therefore the valve is not tight, and leaks steam. This is an objectionable feature of the ordinary D valve, which is well known, and it is one of the principal objects of my invention to construct a D valve in such form as to overcome this objection by preventing the rocking movement and by taking off the wear on the corners 29. This purpose is partially accomplished by the construction hereinbefore described, and partially accomplished by the construction whereby the valve is balanced as will be hereinafter more fully explained.

By the construction already described, and by the use of the extensions 18, it will be seen that the lower surfaces of the extensions 18 beyond the passages 19 engage the valve seat, so that there is no tendency for the valve to rock, and the wear will be upon the corners or edges 30, which will not cause any leakage or loss of steam. The corners or edges 29 will remain sharp, so that the valve will retain its efficiency.

In order to secure complete and perfect lubrication for the sliding parts of the valve and valve seat, I have provided the means above described, including the material 20, so that the oil will pass downwardly through the recess 20 and the passages 21 to the surface of the valve seat where it will be distributed along the groove 22, and perfect lubrication between the extensions 18 and the valve seat will be maintained.

The accomplishment of such lubrication, I consider as another very important advantage of my improved valve.

I will now describe the construction whereby my valve is balanced.

Resting upon the upper part of the valve is a plate 31 which, as illustrated in Fig. 2, is of considerably greater width than the body portion of the valve. In this connection it may be stated that the area of the projecting portions of the plate 31 including the area of the body 15 above the recess 17 is substantially equal to the area of the downward valve which is subjected to the downward pressure of steam, so that when the valve is in operation, the upward pressure of steam will tend to balance the downward pressure thereof on the valve to balance the valve. The plate 31 is secured to the body 15 of the valve by means of bolts 32.

Near its side edges the plate 31 is provided with longitudinally arranged grooves 33. Mounted in the grooves 33 are upright plates 34 which may slide vertically in the grooves 33 and are yieldingly held at the upper limit of their movement by means of springs 35 in the bottoms of the grooves 33.

At the upper end of each plate 34 are opposite lateral extensions 36, clearly shown in Fig. 2, and it will thus be seen that the plates 34 with the extensions 36 have substantially the form of a T-iron.

In the extensions 36, on opposite sides of the plate 34, are longitudinal slots or openings 37. The use of the extensions 36 also gives a large bearing surface at the upper end of each plate 34, so that there will be less tendency for the plates 34 to rock and wear against the sides or walls of the grooves 33.

Extended through the body 15 and through the central portion of the plate 31 are passages 38 whereby any steam which may leak past the plates 36 may pass downwardly to the exhaust port 12. The openings 37 afford passages for a lubricant whereby the lower surface of the balance plate 39, against which the upper part of the plates 34 and the extension 36 slide, may be thoroughly lubricated.

In the upper surface of the plate 31 are grooves 33ª, similar to the grooves 33, arranged at right angles thereto near the outer edges of the plate 31, and in the grooves last described, are mounted plates 40, similar to the plates 34, which at their ends fit against the plates 34, the inner extensions 36 being cut away at their ends to allow the ends of the plates 40 to bear snugly against the plates 34. At their upper ends, the plates 40 are provided with a plurality of opposite, laterally extending tongues 41, which afford broad bearing surfaces, and at the same time allow spaces for the admission of a lubricant to the plate 39. The plates 34 and 40 are similarly mounted in the grooves in the plate 31.

It will be understood that there is oil in the steam passing through to the valve, so that the wearing parts of the valve are lubricated by oil furnished with the steam, and held in suspension therein.

In the edges of the plate 31 on each side thereof are horizontal openings extending from the grooves 33 and 33$^a$ respectively to the outer surfaces of the plates. In the openings 42 are mounted springs 43. Outside the springs 43 are mounted screw-threaded bolts 44, whereby the springs 43 are held against the plates 34 and 40 for maintaining tight joints at all times. It will thus be seen that by means of the plate 31 my valve is balanced and at the same time the upper moving parts are thoroughly lubricated.

My improved valve, on account of the extensions 18 and the means for lubrication, will wear much longer than the ordinary sliding D valve used on locomotives.

Thus by the use of the extensions on the valve which overlap or travel upon the parts of the valve seat which project beyond the passages 13, during all operations of the valve, two vitally important purposes are accomplished, which are two of the main purposes of this improvement. One of these purposes is the affording of the broad bearing for the lower surface of the slide valve, whereby the ends of the valve are supported at all times on the valve seat and the rocking or tilting of the valve, which is a serious defect in many slide valves, is wholly avoided. The other purpose is to afford a receptacle for the oil receiving material 21$^a$ which absorbs from the steam the oil in solution therein, and furnishes lubricant which can pass downwardly through the passage 21 for thoroughly and completely oiling the valve seat.

The extensions, particularly when formed with the oiling means shown, permit the oiling of the surfaces of the valve seat which extend between the passages 13 and the extreme ends of the valve seat, by oil from the steam in the steam chest, and also by oil passing through passages 21. On each movement of the valve, the under surface of the extension is lubricated by oil in the steam as is clearly illustrated from the showing of the right-hand extension in Fig. 2.

The valve seat is also lubricated by oil in the steam which passes downwardly through the passages 19. It thus appears that the surfaces of the valve seat and the valve are more thoroughly and continually lubricated than could be possible with the ordinary form of valve having no such extensions.

It is well known that in ordinary locomotives a constant supply of oil is furnished to the steam so that when the steam passes to the slide valve it contains oil. Where everything is working satisfactorily oil will be fairly well distributed over the working parts of the slide valve. There are times, however, when the supply of oil to the steam may be accidentally shut off, and there are also times, as when the engine is coasting, when the slide valves are working but no steam is being furnished thereto and consequently no oil is being furnished to the valve parts. By providing the recesses 20 and the waste 21$^a$ or other material in said recesses, for collecting, holding and distributing oil, I provide means for taking up surplus oil if there should be more than enough to properly lubricate the parts, and holding it until such time as not enough oil is furnished to saturate the waste 21$^a$, whereupon oil will pass from such waste as a sort of reservoir through the passages 21. I thereby obtain a more even and continuous and thorough lubrication than could otherwise be done.

It is also clear that by the use of the extensions, it is impossible for the valve and valve seat to wear convex and concave, particularly along the lower edges of the valve, as occurs where the ordinary D valves are used, insomuch as with my valve, the valve is held properly seated at all times and the extensions prevent any rocking of the valve. Where the ordinary D valve is used, the valve and valve seat wear convex and concave, which requires the re-surfacing of the valve seat by chipping or the like, and the re-surfacing of the valve.

In the actual use of locomotives there is, of course, a constant leakage during the time when the valve is deteriorating until it becomes so bad it must be repaired. The loss due to such leakage is avoided where my valve is used.

Where the ordinary D valves are used there is a very large loss of locomotive service, while the engine is undergoing repairs, in addition to the loss due to expense of making the repairs.

It thus follows that my improved valve lengthens the life of the valve, and increases the years of service thereof, and also increases the active life of the engine, resulting in a saving of labor, and also in an economy of fuel, oil and water, during the use of the engine, while there is no increase in the consumption of lubricant.

It will readily be seen that my valve may be used with any expansive fluid engine, stationary or traction, using air, steam or the like.

Some changes may be made in the construction and arrangement of the parts of my improved valve without departing from its essential features and purposes, and it is my intention to cover by this application any such changes which may be included within the scope of my claims.

I claim as my invention:

1. In a D valve, a valve seat having ports, a valve mounted thereon having a central body portion with a recess in its lower surface, opposite laterally extending members on said valve adapted to slide on said seat, provided with ports, the members of said valve beyond said ports being provided with recesses in their upper surfaces, and with passages from the bottoms of said recesses to their lower surfaces, oil collecting, holding and distributing material mounted in said recesses, said valves being so constructed that said last passages never register with the ports in said valve seat.

2. In a D valve, a valve seat having ports, a sliding valve mounted thereon having a central body portion with a recess in its lower surface, opposite laterally extending members on said valve adapted to slide on said seat provided with passages, the members of said valve beyond said passages being provided with recesses in their upper surfaces to hold lubricant collecting means, and with restricted passages from the bottoms of said recesses to their lower surfaces for carrying lubricant.

3. In a D valve, a valve seat having ports, a sliding valve mounted thereon having a central body portion with a recess in its lower surface, opposite laterally extending members on said valve adapted to slide on said seat, provided with passages, the members of said valve beyond said passage being provided with recesses in their upper surfaces, and with passages from the bottoms of said recesses to their lower surfaces, oil collecting, holding and distributing material mounted in said recesses in said laterally extending members, and means for holding said material in said last named recesses.

4. In a D valve, a valve seat having ports, a sliding valve mounted thereon having a central body portion with a recess in its lower surface, opposite laterally extending members on said valve adapted to slide on said seat, provided with passages, the members of said valve beyond said passages being provided with recesses in their upper surfaces, and with passages from the bottoms of said recesses to their lower surfaces, oil collecting, holding and distributing material mounted in said recesses in said laterally extending members, a screen over said material, and means for holding said screen in position.

Des Moines, Iowa, December 7, 1915.

RICHARD W. MEWES.

Copies of this patent may be obtained for five cents each, by addressing the "Commissioner of Patents, Washington, D. C."